US008848772B2

(12) United States Patent
Greenberg et al.

(10) Patent No.: US 8,848,772 B2
(45) Date of Patent: Sep. 30, 2014

(54) DEVICE, SYSTEM AND METHOD OF PHASE QUANTIZATION FOR PHASED ARRAY ANTENNA

(75) Inventors: Maxim Greenberg, Atlit (IL); Tom Harel, Shfaim (IL); Yuval Lomnitz, Herzelia (IL)

(73) Assignee: Intel Corporation, Santa Clara, CA (US)

( * ) Notice: Subject to any disclaimer, the term of this patent is extended or adjusted under 35 U.S.C. 154(b) by 150 days.

(21) Appl. No.: 13/528,952

(22) Filed: Jun. 21, 2012

(65) Prior Publication Data

US 2013/0343444 A1 Dec. 26, 2013

(51) Int. Cl.
*H04L 27/22* (2006.01)
*H04B 17/00* (2006.01)

(52) U.S. Cl.
USPC .......................................... 375/226; 375/329

(58) Field of Classification Search
None
See application file for complete search history.

(56) References Cited

U.S. PATENT DOCUMENTS

| | | | | |
|---|---|---|---|---|
| 3,611,401 | A * | 10/1971 | Connolly | 342/377 |
| 3,643,075 | A * | 2/1972 | Hayes | 702/57 |
| 3,680,109 | A * | 7/1972 | Steudel | 342/371 |
| 4,188,633 | A * | 2/1980 | Frazita | 342/377 |
| 4,191,960 | A * | 3/1980 | Lopez | 342/377 |
| 4,649,553 | A * | 3/1987 | Madni et al. | 377/43 |
| 4,852,125 | A * | 7/1989 | Suzuki | 375/245 |
| 5,103,232 | A * | 4/1992 | Chang et al. | 342/372 |
| 5,187,487 | A * | 2/1993 | Riza | 342/372 |
| 6,351,240 | B1 * | 2/2002 | Karimullah et al. | 343/700 MS |
| 7,327,313 | B2 * | 2/2008 | Hemmi et al. | 342/368 |
| 7,710,319 | B2 * | 5/2010 | Nassiri-Toussi et al. | 342/377 |
| 2005/0007275 | A1 * | 1/2005 | Fowell et al. | 342/359 |
| 2006/0119510 | A1 * | 6/2006 | Hemmi et al. | 342/368 |
| 2009/0180446 | A9 * | 7/2009 | Kent et al. | 370/334 |
| 2012/0105285 | A1 * | 5/2012 | Park et al. | 342/417 |

OTHER PUBLICATIONS

IEEE Standard for Information technology—Telecommunications and information exchange between systems—Local and metropolitan area networks—Specific requirements. Part 11: Wireless LAN Medium Access Control (MAC) and Physical Layer (PHY) Specifications—Jun. 2007.
WiGig MAC and PHY Specification , Version 1.0; Final Specification; Apr. 2010.
HP. Van Der Kuijp; "Adaptive beamforming algorithms for a 60 GHz multiple antenna receiver." Master of Science thesis Report No. 05-06; Project period: Jul. 2005-Feb. 2006. Eindhoven University of Technology Department of Electrical Engineering Signal Processing Systems. Commissioned by Prof. Dr. Ir. J.W.M. Bergmans (TU/e).

* cited by examiner

*Primary Examiner* — Chieh M Fan
*Assistant Examiner* — Bahman Badipour
(74) *Attorney, Agent, or Firm* — Shichrur & Co.

(57) ABSTRACT

Some demonstrative embodiments include devices, systems and/or methods of phase quantization. For example, a device may include a phase quantizer to receive a plurality of non-quantized phase values corresponding to a plurality of antenna elements of a phased-array antenna, based on the plurality of non-quantized phase values to select a predefined rotation angle, to determine a plurality of rotated non-quantized phase values by rotating the plurality of non-quantized phase values by the selected rotation angle, and to generate a plurality of quantized phase values by quantizing the plurality of rotated non-quantized phase values.

23 Claims, 4 Drawing Sheets

DEVICE, SYSTEM AND METHOD OF PHASE QUANTIZATION FOR PHASED ARRAY ANTENNA

BACKGROUND

A phased-array antenna may include a plurality of radiating antenna elements configured to simultaneously emit signals in accordance with a beamforming scheme.

For example, the phased array antenna may be controlled to form a beam directed in a particular direction, or to receive a beam from a particular direction, by shifting phases of the signals emitted by the plurality of antenna elements. The phases of the signals emitted by the antenna elements may be shifted, for example, to provide a constructive and/or destructive interference configured to steer the beam in the particular direction.

A plurality of phase shifters may be associated with the plurality of antenna elements to control the phase shifts applied by the plurality of antenna elements. For example, each phase shifter may shift the phase state of a respective antenna element.

A set of required phase values to be applied to the antenna elements may be determined, e.g., by a phase estimator, for steering the beam in the particular direction, or for receiving the beam from the particular direction.

The phase shifters may include digital devices or analog devices, which are digitally controlled. Accordingly, the phase shifters may only be able to apply to the antenna elements phase states, which are selected from a predefined set of phase state values.

The number of phase state values may depend, for example, on a bit-size utilized by the phase shifter for representing the phase values. For example, a two-bit phase shifter may only be able to apply four phase state values, e.g., zero degrees (°), 90°, 180° and 270°.

In order to comply with the set of phase state values, the set of required phase values may be quantized, e.g., by assigning a quantized phase value to represent each of the required phase values.

A quantization error may result from the quantization process. The quantization error may affect an accuracy of the beamforming.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
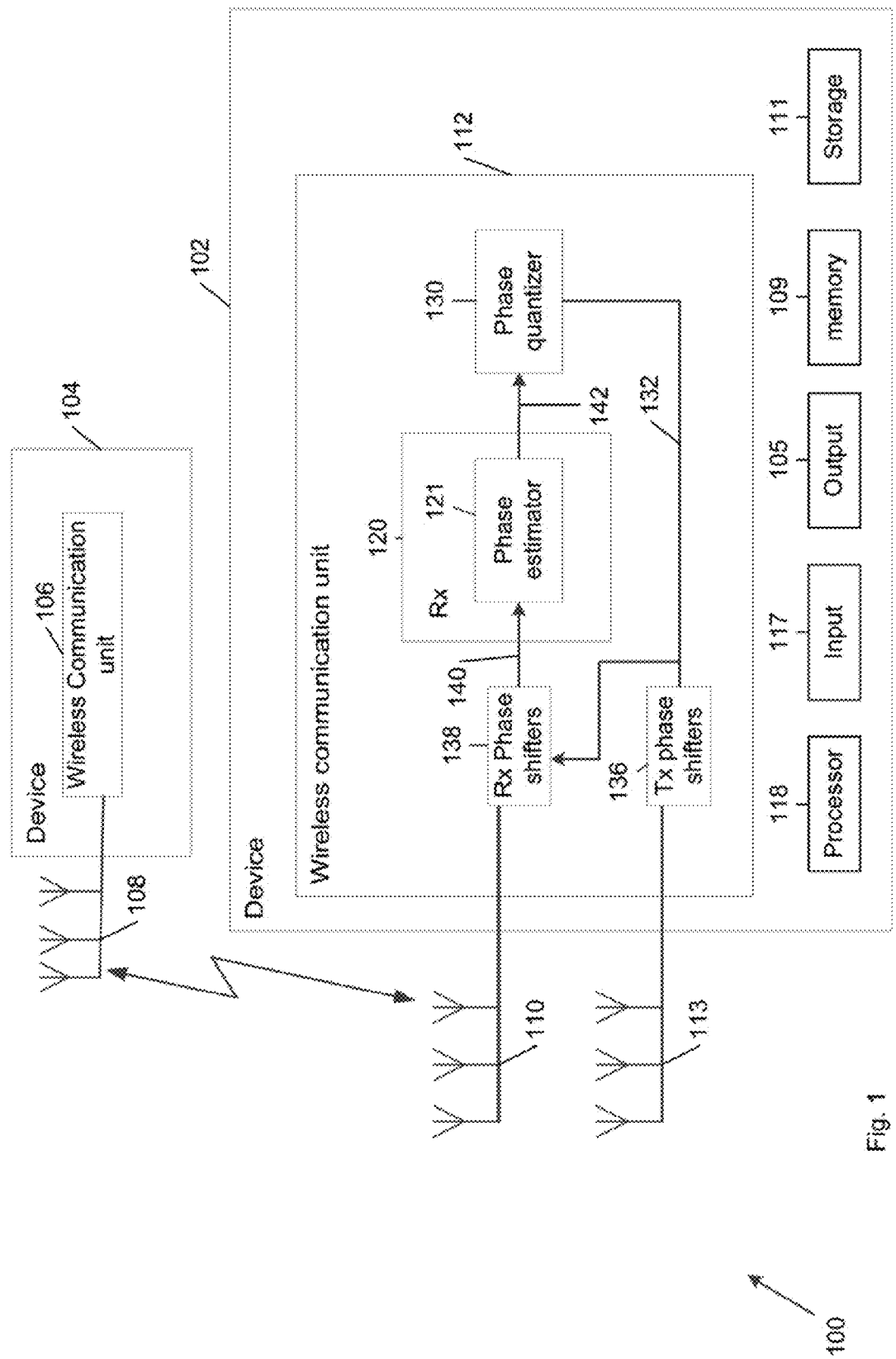
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Wireless Metropolitan Area Network (WMAN) communication system, a Personal Area Network (PAN), a Wireless PAN (WPAN), devices and/or networks operating in accordance with existing IEEE 802.11 standards ("the 802.11 standards"), e.g., including IEEE 802.11 (*IEEE 80231-2007: Standard for Information technology—Telecommunications and information exchange between systems—and metropolitan area networks—Specific requirements, Part 11: Wireless LAN Medium Access Control (MAC) and Physical Layer (PHY) Specifications—June* 2007), 802.11n ("*IEEE 802.11n-2009—Amendment 5: Enhancements for Higher Throughput. IEEE-SA. 29 Oct.* 2009"), 802.11ac ("*Very High Throughput <6 Ghz*"), 802.11 task group ad (TGad) ("*Very High Throughput 60 GHz*"), and/or future versions and/or derivatives thereof, devices, and/or networks operating in accordance with IEEE 802.16 standards and/or future versions and/or derivatives thereof, devices, and/or networks operating in accordance with existing Wireless-Gigabit-Alliance (WGA) and/or WirelessHD™ specifications and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may be used to provide a wireless service.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "communicating" as used herein with respect to information includes transmitting the information and/or receiving the information. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. Information may be communicated, for example, between first and second modules by transferring the information from the first module to the second module and/or by transferring the information from the second module to the first module.

The phrase "directional band" (DBand), as used herein, may relate to a frequency band wherein the Channel starting frequency is above 45 GHz.

The phrase "Ultra Band (UB)" may relate to the frequency band of 57-66 GHz.

The phrase "mmWave STA (STA)" may relate to a station (STA) having a radio transmitter, which is operating on a channel that is within the UB.

Reference is now made to FIG. 1, which schematically illustrates a block diagram of a wireless communication system 100, in accordance with some demonstrative embodiments.

In some demonstrative embodiments, system 100 may include one or more devices, e.g., devices 102 and 104, capable of communicating wireless communication signals over a wireless communication channel. For example, device 104 may include a wireless communication unit 106, and device 102 may include a wireless communication unit 112 capable of communicating wireless communication signals with wireless communication unit 106.

In some demonstrative embodiments, the wireless communication channel may include, for example, a radio channel, an IR channel, a RF channel, a Wireless Fidelity (WiFi) channel, and the like. In one example, the wireless communication channel may include a UB channel, e.g., a 60 GHz channel.

In some demonstrative embodiments, wireless communication devices 102 and/or 104 may perform the functionality of mmWave stations ("mSTA"). For example, wireless communication devices 102 and/or 104 may be configured to communicate over the Dband.

In some demonstrative embodiments, devices 102 and/or 104 may communicate according to a beamforming scheme. For example, device 102 may include at least phased array antenna 110, and device 104 may include at least one phased array antenna 108.

In some demonstrative embodiments, phased-array antennas 108 and/or 110 may each include a plurality of antenna elements configured to simultaneously emit and/or receive signals in accordance with the beamforming scheme.

In some demonstrative embodiments, phased array antenna 108 may include a transmit (Tx) phased array antenna and phased array antenna 110 may include a receive (Rx) phased array antenna. For example, phased array antenna 108 may be configured to form a beam directed in a particular direction of phased array antenna 110, e.g., by shifting phases of the signals emitted by the plurality of antenna elements of antenna 108. The phases of the signals emitted by the antenna elements may be shifted, for example, to provide a constructive and/or destructive interference configured to steer the beam in the particular direction. Phased array antenna 110 may be configured to receive the beam transmitted by phased array antenna 108, e.g., by shifting phases of the plurality of antenna elements of antenna 110, for example, to receive the steered beam from phased array antenna 108.

In some demonstrative embodiments, device 102 may also include a Tx phased array antenna and/or device 104 may also include an Rx phased array antenna. For example, device 102 may include a Tx phased array antenna 113, e.g., as described below.

In some demonstrative embodiments, devices 102 and/or 104 may implement transmit and receive functionalities using separate transmit and receive phased array antennas, for example, device 102 may implement Rx phased array antenna 110 and Tx phased array antenna 113. In other embodiments, devices 102 and/or 104 may implement transmit and receive functionalities using common and/or integrated transmit/receive elements. For example, phase array antenna 110 may perform the functionality of both transmit and receive phased array antennas 110 and 113. Antenna 108 may implement transmit and receive functionalities using separate transmit and receive antenna elements. Alternatively, antenna 108 may implement transmit and receive functionalities using common and/or integrated transmit/receive elements.

In some demonstrative embodiments, devices 102 and/or 104 may include a plurality of phase shifters associated with the plurality of antenna elements of phased array antennas 108, 110 and/or 113 to control the phase shifts applied by the plurality of antenna elements.

For example, wireless communication unit 112 may include a plurality of phase shifters 138 associated with the plurality of antenna elements of phased antenna array 110 to control the phase shifts applied by the plurality of antenna elements of phased antenna array 110. For example, each phase shifter 138 may shift the phase state of a respective antenna element of phased antenna array 110.

In some demonstrative embodiments, wireless communication unit 112 may include a plurality of phase shifters 136 associated with the plurality of antenna elements of phased antenna array 113 to control the phase shifts applied by the plurality of antenna elements of phased antenna array 113. For example, each phase shifter 136 may shift the phase state of a respective antenna element of phased antenna array 113.

In some demonstrative embodiments, phase shifters 138 may control the phase shifts applied by the plurality of antenna elements of phased antenna array 110 and/or phase shifters 136 may control the phase shifts applied by the plurality of antenna elements of phased antenna array 113, for example, in accordance with a plurality of quantized phase values 132, e.g., as described in detail below.

In some demonstrative embodiments, a set of required phase values to be applied to the antenna elements of phased array antennas 110 and/or 113 may be determined for directing phased array antennas 110 and/or 113 in a required particular direction.

In some demonstrative embodiments, wireless communication unit 112 may include a phase estimator 121 configured to generate a plurality of estimated phase values 142 representing phases to be applied to the plurality of antenna elements of phased array antennas 110 and/or 113.

In some demonstrative embodiments, phase estimator 121 may be implemented as part of any module and/or element of wireless communication unit 112. For example, phase estimator 121 may be implemented as part of a Rx module 120, e.g., an Rx chain, an Rx Radio-Frequency (RF) module, a Rx base-band (BB) module, and the like.

In one example, Rx module 120 may receive signals 140 representing signals received via phased array antenna 110, and phase estimator 121 may be configured to determine estimated phase values 142, e.g., based on signals 140 and/or any other information, e.g., relating to the beamforming scheme utilized for communication between devices 102 and 104.

For example, Rx module 120 may receive signals 140 representing signals received from device 104, and phase estimator 121 may be configured to determine estimated phase values 142 to be applied by phase shifters 138 to signals received via Rx phased array antenna 110.

In another example, Rx module 120 may receive signals 140 representing beamforming feedback signals received from device 104, and phase estimator 121 may be configured to determine estimated phase values 142 to be applied by phase shifters 136 to transmissions via Tx phased array antenna 113.

In some demonstrative embodiments, phase shifters 136 and/or 138 may include digital devices or analog devices, which are digitally controlled.

Accordingly, the phase shifters 136 and/or 138 may only be able to apply to the antenna elements of phased array antennas 110 and/or 113 phase states, which are selected from a predefined set of phase state values.

The number of phase state values may depend, for example, on a bit-size utilized by the phase shifter 136 and/or 138 for representing the phase state values.

For example, phase shifters 136 and/or 1238 may include a two-bit phase shifter, which may only be able to apply four phase state values, e.g., zero degrees (°), 90°, 180° and 270°.

In another example, phase shifters 136 and/or 138 may include a three-bit phase shifter, which may only be able to apply eight phase state values, e.g., 0°, 45°, 90°, 135°, 180°, 225°, 270° and 315°.

In some demonstrative embodiments, phase values 142 may include values of a range of possible values, which is broader than the limited number of phase state values. In one example, phase values 142 may include values of a continuous range or a semi-continuous range of values, e.g., a continuous range of integer and/or non-integer values between 0° and 360°.

In some demonstrative embodiments, phase values 142 may be quantized, e.g., by assigning a quantized phase state value to represent each of phase values 142, for example, in order to comply with the set of phase state values supported by phase shifters 136 and/or 138.

In some demonstrative embodiments, wireless communication unit 112 may include a phase quantizer 130 configured to receive the plurality of non-quantized phase values 142 corresponding to the plurality of antenna elements of phased-array antenna 110 and/or 113, and to generate the plurality of quantized phase values 132 to be provided, for example, to phase shifters 138 and/or 136.

In some demonstrative embodiments, phase quantizer 130 may be implemented as part of a BB module of wireless communication unit 112, for example, as part of a receiver BB module and/or as part of a transmitter BB module. In other embodiments, phase quantizer 130 may be implemented as part of any other module or element of wireless communication unit 112.

In some demonstrative embodiments, a quantization error may result from the quantization process of quantizer 130.

The quantization error may affect an accuracy of the beamforming scheme. For example, applying the quantized phase values 132 to phased array antenna 110 and/or phased array antenna 113 may result in a beamforming scheme, which is different from a required beamforming scheme corresponding to non-quantized phase values 142.

In some demonstrative embodiments, the phases of the antenna elements of phased array antenna, e.g., phased array antenna 110 and/or 113, may be represented by a vector array, denoted Y, of complex numbers. A channel response, denoted $h_i$, of each antenna element, denoted i, of the phased array antenna may have a unit gain, e.g., as follows:

$$h_i = e^{j\theta_i} \quad (1)$$

wherein $\theta_i$ denotes the phase applied to the antenna element i.

In some demonstrative embodiments, a plurality of weights, denoted $w_i$, may be determined in order to maximize a total energy at a receiving end, e.g., as follows:

$$w_i = e^{-j\frac{\pi}{2}k_i} \quad (2)$$

Accordingly, the energy at a receiver of the beamformed communication may be determined by:

$$|\Sigma_i w_i h_i|^2 \quad (3)$$

For example, the energy may be constant, e.g., if perfect beamforming is performed.

In some demonstrative embodiments, at an optimum setting of the phased array antenna, a phase of the cumulative beam $\Sigma_i w_i h_i$ may be $e^{ja}$, wherein a denotes an angle for the optimum setting.

Accordingly, knowing a, in the optimal solution, each phase shifter, e.g., of phase shifters 138 and/or 136, may be set such that the angle of $w_i h_i$ is closest to the angle a. Since a is not known, the phase values 142 may be determined, for example, by scanning over all possible values of a.

In some demonstrative embodiments, a functionality of a phased array antenna, e.g., phased array antenna 110 and/or 113, may not be affected by an absolute phase $\theta_i$ applied to each antenna element of the phased array antenna.

In some demonstrative embodiments, the functionality of a phased array antenna, e.g., phased array antenna 110 and/or 113, may be affected by differential phases between the antenna elements of the phased array antenna.

Accordingly, in some demonstrative embodiments, the quantization error of quantizer 130 may be reduced, e.g., minimized, for example, by reducing, e.g., minimizing, a quantization error between each non-quantized value of values 142 and a respective quantized value of values 132, e.g., as described in detail below.

In some demonstrative embodiments, a quantization process, in which each non-quantized phase value is quantized by replacing the non-quantized phase value with a quantized value, which is closest to the non-quantized value, may result in a relatively large quantization error. For example, two non-quantized phase values, which may have a first phase difference, may be mapped to two quantized phase values, which may have a second phase difference, which is different from the first phase difference.

For example, a first non-quantized phase value may include the phase value of 46° and a second non-quantized phase value may include the phase value of 134°.

According to a two-bit quantization scheme having the four phase state values of 0°, 90°, 180° and 270°, both the first and second non-quantized phase values may be mapped to the same quantized value of 90°.

As a result, the quantized values may have a phase difference of 0°, while the first and second non-quantized values have a phase difference of 88°.

In some demonstrative embodiments, phase quantizer 130 may be configured to quantize non-quantized values 142, by selectively rotating non-quantized values 142, prior to performing the quantization.

For example, phase quantizer 130 may rotate phase values 142 by applying, e.g., to all non-quantized values 142, a common rotation angle, prior to performing the quantization, e.g., as described in detail below.

In some demonstrative embodiments, phase quantizer 130 may be configured to select whether or not to rotate non-quantized values 142 and/or to select a rotation angle to be applied for rotating non-quantized values 142, by applying a predefined criterion to non-quantized values 142, e.g., as described in detail below.

In some demonstrative embodiments, the predefined criterion may be defined such that, for example, a difference between a non-quantized phase difference, between first and second non-quantized phase values 142, and a quantized phase difference, between first and second quantized phase values 130, is reduced, e.g., minimized.

In some demonstrative embodiments, phase quantizer 130 may select a predefined rotation angle to be applied for rotating non-quantized phase values 142 based, for example, based on the plurality of non-quantized phase values 142, e.g., as described in detail below.

For example, a rotation angle of 45° may be applied to rotate the first non-quantized phase value of 46° and the second non-quantized phase value of 134°, resulting in a first rotated phase value of 91° and a second rotated phase value of 179°.

According to the two-bit quantization scheme having the four phase state values of 0°, 90°, 180° and 270°, the first rotated phase value may be mapped to the quantized phase value of 90°, while the second rotated phase value may be mapped to the quantized phase value of 180°.

As a result, first and second the quantized rotated phased values may have a phase difference of 90°, which is relatively close to the phase difference of 88° between the first and second non-quantized phase values.

In some demonstrative embodiments, phase quantizer 130 may determine a plurality of rotated non-quantized phase values corresponding to the plurality of phase values 142, respectively, by rotating the plurality of non-quantized phase values by the selected rotation angle.

In some demonstrative embodiments, phase quantizer 130 may generate the plurality of quantized phase values 132 corresponding to non-quantized phase values 142 by quantizing the plurality of rotated non-quantized phase values.

In some demonstrative embodiments, phase quantizer 130 may select the rotation angle from a plurality of predefined rotation angles, based on the plurality of non-quantized phase values 142.

In some demonstrative embodiments, the plurality of rotation angles may include a zero rotation angle and at least one non-zero rotation angle. Applying the zero rotation angle to non-quantized phase values 142 may be analogous, for example, to quantizing non-quantized phase values 142, e.g., without rotating the non-quantized phase values 142.

In some demonstrative embodiments, the plurality of rotation angles may include a predefined, finite, set of rotation angles.

In some demonstrative embodiments, the number of rotation angles in the set of rotation angles may affect the resulting quantization error. For example, a greater number of rotation angles may result in a reduced quantization error, e.g., as described below with reference to FIG. 3.

In some demonstrative embodiments, the plurality of rotation angles may include rotation angles satisfying the following condition:

$$\tan(\theta) = \frac{1}{2^k} \quad (4)$$

wherein θ denotes a particular rotation angle of the set of rotation angles, and wherein k denotes a positive integer.

In some demonstrative embodiments, the plurality of rotation angles may include one or more rotation angles, which are a combination, e.g., a linear combination, of two or more rotation angles satisfying the condition 4.

Defining the rotation angles according to the condition 4 may allow substituting a multiplication operation, which may be required for determining a rotated vector of the rotated phases, resulting from the rotation angle, with shifting and summation operations. As a result, the rotation angles according to the condition 4 may enable efficient implementation, e.g., hardware implementation of phase quantizer 130.

In some demonstrative embodiments, phase quantizer 130 may select the rotation angle based on quantization errors resulting from applying the plurality of rotation angles to non-quantized phase values 142.

In some demonstrative embodiments, phase quantizer 130 may select the rotation angle, such that a quantization error resulting from the selected rotation angle is lesser than a quantization error resulting from each rotation angle of the plurality of rotation angles.

In some demonstrative embodiments, phase quantizer 130 may determine the quantization error corresponding to each rotation angle of the plurality of rotation angles by applying a predefined metric to a relationship between the non-quantized phase values 142 and quantized values resulting from quantizing the rotated phase values resulting after applying the rotation angle to non-quantized phase values 142.

In some demonstrative embodiments, phase quantizer 130 may select the rotation angle based on the following condition:

$$\theta_{selected} = \arg\min_\theta(d([X^*e^{j\theta}], X^*e^{j\theta})) \quad (5)$$

wherein $\theta_{selected}$ denotes the selected rotation angle, $\theta$ denotes a particular rotation angle of the plurality of rotation angles, X denotes a complex vector of the non-quantized phase values 142, [ ] denotes a quantization operation, d( ) denotes the predefined quantization error metric, and angle( ) denotes an angle operator.

In some demonstrative embodiments, the quantization error metric d( ) may include, for example, the absolute metric ("abs( )"). The use of the absolute metric may enable, for example, efficient implementation, e.g., hardware implementation, of phase quantizer 130. In other embodiments, the quantization error metric d( ) may include any other metric, e.g., a correlation metric, and the like.

In some demonstrative embodiments, the phases applied to the antenna elements of the phased array antenna, e.g., phased array antenna 110 and/or 113, may be represented, e.g., by the following vector of complex numbers, denoted Y:

$$Y = [X^* e^{j\theta_{selected}}] \quad (6)$$

In some demonstrative embodiments, devices 102 and/or 104 may include, or may be included as part of, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, device 102 may also include, for example, one or more of a processor 118, an input unit 117, an output unit 105, a memory unit 109, and a storage unit 111. Device 102 may optionally include other suitable hardware components and/or software components. In some embodiments, some or all of the components of device 102 may be enclosed in a common housing or packaging, and may be interconnected or operably associated using one or more wired or wireless links. In other embodiments, components of device 102 may be distributed among multiple or separate devices or locations.

Processor 118 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 118 executes instructions, for example, of an Operating System (OS) of wireless communication device 102 and/or of one or more suitable applications.

Input unit 117 includes, for example, a keyboard, a keypad, a mouse, a touch-pad, a track-ball, a stylus, a microphone, or other suitable pointing device or input device. Output unit 105 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 109 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 111 includes, for example, a hard disk drive, a floppy disk drive, a Compact Disk (CD) drive, a CD-ROM drive, a DVD drive, or other suitable removable or non-removable storage units. Memory unit 109 and/or storage unit 111, for example, may store data processed by wireless communication device 102.

Figure 2:
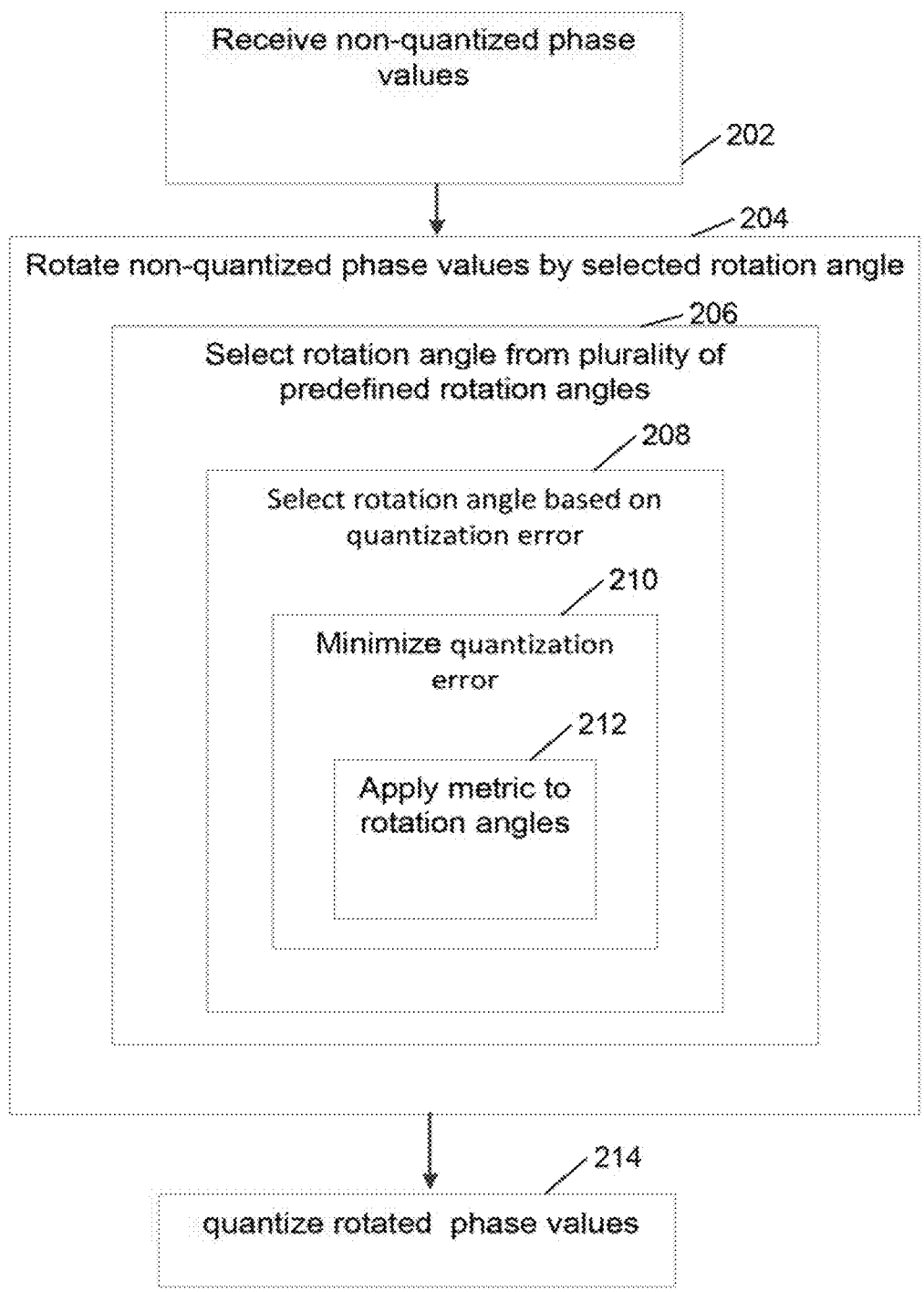
FIG. 2 is a schematic illustration of a method of quantizing phase values of a phased array antenna, in accordance with some demonstrative embodiments.

Reference is made to FIG. 2, which schematically illustrates a method of quantizing phase values of a phased array antenna, in accordance with some demonstrative embodiments. In some demonstrative embodiments, one or more of the operations of the method of FIG. 2, may be performed by a wireless communication system, e.g., system 100 (FIG. 1); a wireless communication device, e.g., device 102 (FIG. 1); a wireless communication unit, e.g., wireless communication unit 112 (FIG. 1); and/or a phase quantizer, e.g., phase quantizer 130 (FIG. 1).

As indicated at block 202, the method may include receiving a plurality of non-quantized phase values corresponding to a plurality of antenna elements of a phased-array antenna. For example, phase quantizer 130 (FIG. 1) may receive non-quantized phase values 142 (FIG. 1), e.g., as described above.

As indicated at block 204, the method may include based on the plurality of non-quantized phase values, rotating the plurality of non-quantized phase values by a selected rotation angle to determine a plurality of rotated non-quantized phase values. For example, phase quantizer 130 (FIG. 1) may rotate each of non-quantized phase values 142 by a selected rotation angle, e.g., as described above.

As indicated at block 214, the method may include generating a plurality of quantized phase values by quantizing the plurality of rotated non-quantized phase values. For example, phase quantizer 130 (FIG. 1) may generate quantized phase values 132 (FIG. 1) corresponding to non-quantized phase values 142 (FIG. 1) by quantizing the rotated phase values, e.g., as described above.

As indicated at block 206, the method may include selecting the rotation angle from a plurality of predefined rotation angles based on the plurality of non-quantized phase values.

In some demonstrative embodiments, the plurality of rotation angles may include a zero rotation angle and at least one non-zero rotation angle, e.g., as described above.

For example, the plurality of rotation angles may include one or more rotation angles satisfies the condition 4 and/or one or more rotation angles, which are a combination, e.g., a linear combination of two or more rotation angles satisfying the condition 4, e.g., as described above.

As indicated at block 208, selecting the rotation angle may include selecting the rotation angle based on quantization errors resulting from applying the plurality of rotation angles to the non-quantized phase values.

As indicated at block 210, selecting the rotation angle may include selecting the rotation angle such that a quantization error resulting from the selected rotation angle is lesser than a quantization error resulting from each rotation angle of the plurality of rotation angles.

For example, as indicated at block 212, selecting the rotation angle may include determining a particular quantization error corresponding to a particular rotation angle of the plurality of rotation angles by applying a predefined metric to a relationship between the non-quantized phase values and quantized values resulting from the particular rotation angle.

For example, selecting the rotation angle may include selecting the rotation angle $\theta_{selected}$ based on condition 5, e.g., as described above.

Figure 3:
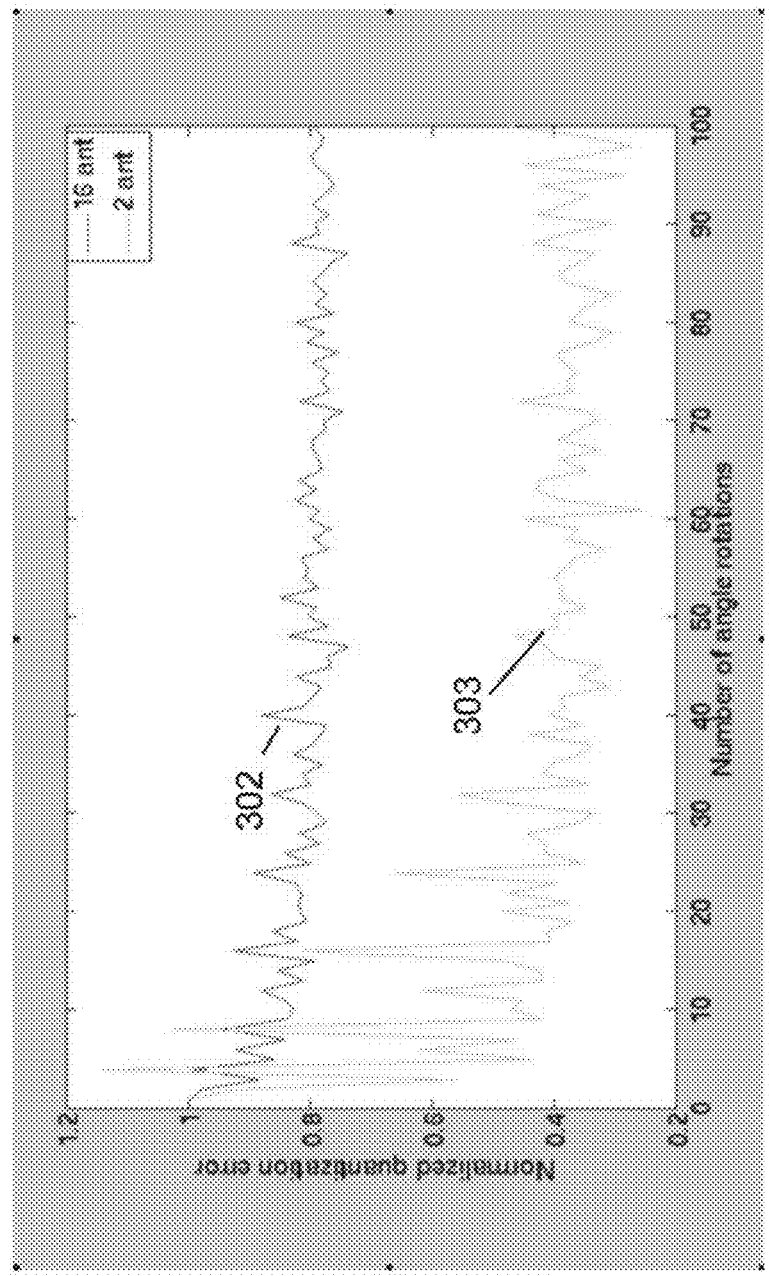
FIG. 3 is a schematic illustration of a graph depicting first and second quantization error curves corresponding to first and second numbers of phased-array antenna elements, respectively, in accordance with some demonstrative embodiments.

FIG. 3 is a schematic illustration of a graph depicting a first quantization error curve 300 representing a quantization error versus a number of rotation angles, e.g., the set of rotation angles utilized by phase quantizer 130 (FIG. 1), with respect to a phased array antenna including two antenna elements, and a second quantization error curve 302 representing the quantization error versus the number of rotation angles with respect to a phased array antenna including sixteen antenna elements, in accordance with some demonstrative embodiments.

The quantization error may be determined, for example, based on the quantization error metric, e.g., with respect to an error measured between quantized phase values 132 (FIG. 1) and non-quantized phase value 142 (FIG. 1), as described above.

As shown in FIG. 3, the quantization error, e.g., of quantized phase values 132 (FIG. 1), may decrease as the number of rotation angles, e.g., in the set of rotation angles utilized by quantizer 130 (FIG. 1), increases. The decrease in the quantization error may result for example, in an increase, e.g., of about 1 Decibel (dB) or more, in a direction gain of a beamformed signal.

Figure 4:
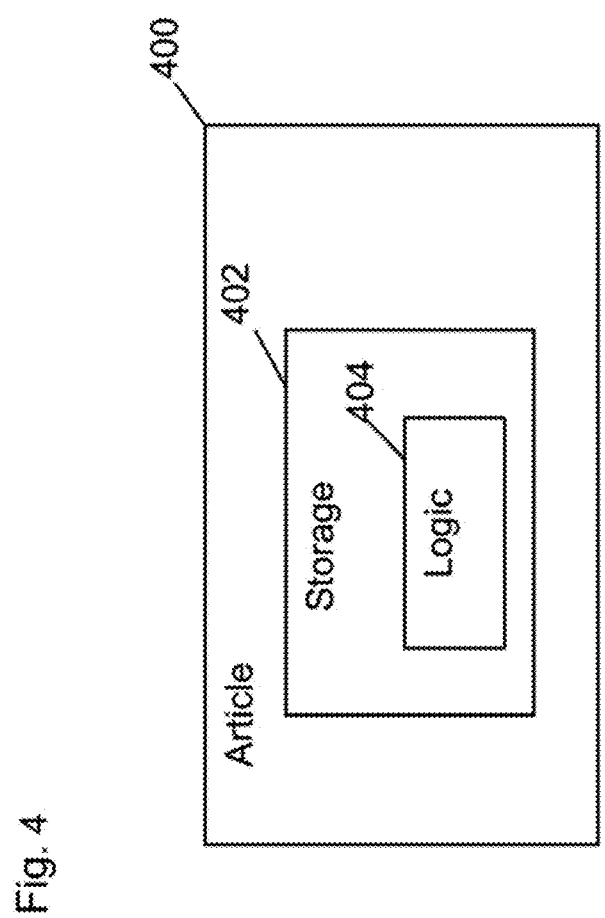
FIG. 4 is a schematic illustration of an article of manufacture, in accordance with some demonstrative embodiments.

Reference is made to FIG. 4, which schematically illustrates an article of manufacture 400, in accordance with some demonstrative embodiments. Article 400 may include a non-transitory machine-readable storage medium 402 to store logic 404, which may be used, for example, to perform at least part of the functionality of wireless communication unit 112 (FIG. 1), phase quantizer 140 (FIG. 1) and/or to perform one or more operations of the method of FIG. 2. The phrase "non-transitory machine-readable medium" is directed to include all computer-readable media, with the sole exception being a transitory propagating signal.

In some demonstrative embodiments, article 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
    a phase estimator to determine a plurality of non-quantized phase values corresponding to a plurality of antenna elements of a phased-array antenna; and
    a phase quantizer to select, based on the plurality of non-quantized phase values, a predefined rotation angle, to determine a plurality of rotated non-quantized phase values by rotating said plurality of non-quantized phase values by said selected rotation angle, and to generate a plurality of quantized phase values by quantizing said plurality of rotated non-quantized phase values, wherein said selected rotation angle satisfies the following condition:

$$\tan(\theta) = \frac{1}{2^k}$$

wherein θ denotes said selected rotation angle, and wherein k denotes a positive integer.

2. The apparatus of claim 1, wherein said phase quantizer is to select said rotation angle from a plurality of predefined rotation angles based on the plurality of non-quantized phase values.

3. The apparatus of claim 2, wherein said phase quantizer is to select said rotation angle based on quantization errors resulting from applying said plurality of rotation angles to said non-quantized phase values.

4. The apparatus of claim 3, wherein a quantization error resulting from the selected rotation angle is lesser than a quantization error resulting from each rotation angle of said plurality of rotation angles.

5. The apparatus of claim 3, wherein said phase quantizer is to determine a particular quantization error corresponding to a particular rotation angle of said plurality of rotation angles by applying a predefined metric to a relationship between said non-quantized phase values and quantized values resulting from the particular rotation angle.

6. The apparatus of claim 2, wherein said plurality of rotation angles include a zero rotation angle and at least one non-zero rotation angle.

7. An apparatus comprising:
a phase estimator to determine a plurality of non-quantized phase values corresponding to a plurality of antenna elements of a phased-array antenna; and
a phase quantizer to select, based on the plurality of non-quantized phase values, a predefined rotation angle, to determine a plurality of rotated non-quantized phase values by rotating said plurality of non-quantized phase values by said selected rotation angle, and to generate a plurality of quantized phase values by quantizing said plurality of rotated non-quantized phase values,
wherein said phase quantizer is to select said rotation angle from a plurality of predefined rotation angles based on the following condition:

$$\theta_{selected} = \arg\min_\theta(d([X^*e^{j\theta}], X^*e^{j\theta}))$$

wherein $\theta_{selected}$ denotes the selected rotation angle, θ denotes a particular rotation angle of said plurality of rotation angles, X denotes a complex vector of said non-quantized phase values, [ ] denotes a quantization operation, and d( ) denotes a predefined quantization error metric.

8. The apparatus of claim 7, wherein said plurality of rotation angles includes a zero rotation angle and at least one non-zero rotation angle.

9. A method comprising:
receiving a plurality of non-quantized phase values corresponding to a plurality of antenna elements of a phased-array antenna;
based on the plurality of non-quantized phase values, rotating said plurality of non-quantized phase values by a selected rotation angle to determine a plurality of rotated non-quantized phase values, wherein said selected rotation angle satisfies the following condition:

$$\tan(\theta) = \frac{1}{2^k}$$

wherein θ denotes said selected rotation angle, and wherein k denotes a positive integer; and
generating a plurality of quantized phase values by quantizing said plurality of rotated non-quantized phase values.

10. The method of claim 9 comprising selecting said rotation angle from a plurality of predefined rotation angles based on the plurality of non-quantized phase values.

11. The method of claim 10 comprising selecting said rotation angle based on quantization errors resulting from applying said plurality of rotation angles to said non-quantized phase values.

12. The method of claim 11, wherein a quantization error resulting from the selected rotation angle is lesser than a quantization error resulting from each rotation angle of said plurality of rotation angles.

13. The method of claim 11 comprising determining a particular quantization error corresponding to a particular rotation angle of said plurality of rotation angles by applying a predefined metric to a relationship between said non-quantized phase values and quantized values resulting from the particular rotation angle.

14. The method of claim 10, wherein said plurality of rotation angles include a zero rotation angle and at least one non-zero rotation angle.

15. A method comprising:
receiving a plurality of non-quantized phase values corresponding to a plurality of antenna elements of a phased-array antenna;
based on the plurality of non-quantized phase values, selecting a selected rotation angle from a plurality of predefined rotation angles according to the following condition:

$$\theta_{selected} = \arg\min_\theta(d([X^*e^{j\theta}], X^*e^{j\theta}))$$

wherein $\theta_{selected}$ denotes the selected rotation angle, θ denotes a particular rotation angle of said plurality of rotation angles, X denotes a complex vector of said non-quantized phase values, [ ] denotes a quantization operation, and d( ) denotes a predefined quantization error metric;
rotating said plurality of non-quantized phase values by the selected rotation angle to determine a plurality of rotated non-quantized phase values; and
generating a plurality of quantized phase values by quantizing said plurality of rotated non-quantized phase values.

16. The method of claim 15, wherein said plurality of rotation angles include a zero rotation angle and at least one non-zero rotation angle.

17. A system comprising:
at least one wireless communication device including:
at least one phased-array antenna including a plurality of antenna elements;
a phase estimator to determine a plurality of non-quantized phase values corresponding to said phased-array antenna; and
a phase quantizer to select a predefined rotation angle based on the plurality of non-quantized phase values, to determine a plurality of rotated non-quantized phase values by rotating said plurality of non-quantized phase values by said selected rotation angle, and to generate a plurality of quantized phase values by quantizing said plurality of rotated non-quantized phase values, wherein said selected rotation angle satisfies the following condition:

$$\tan(\theta) = \frac{1}{2^k}$$

wherein θ denotes said selected rotation angle, and wherein k denotes a positive integer.

18. The system of claim 17, wherein said phase quantizer is to select said rotation angle from a plurality of predefined rotation angles based on quantization errors resulting from applying said plurality of rotation angles to said non-quantized phase values.

19. A system comprising:
at least one wireless communication device including:
at least one phased-array antenna including a plurality of antenna elements;
a phase estimator to determine a plurality of non-quantized phase values corresponding to said phased-array antenna; and
a phase quantizer to select, based on the plurality of non-quantized phase values, a predefined rotation angle, to determine a plurality of rotated non-quantized phase values by rotating said plurality of non-quantized phase values by said selected rotation angle, and to generate a plurality of quantized phase values by quantizing said plurality of rotated non-quantized phase values,
wherein said phase quantizer is to select said rotation angle from a plurality of predefined rotation angles based on the following condition:

$$\theta_{selected} = \arg\min_\theta(d([X*e^{j\theta}], X*e^{j\theta}))$$

wherein $\theta_{selected}$ denotes the selected rotation angle, θ denotes a particular rotation angle of said plurality of rotation angles, X denotes a complex vector of said non-quantized phase values, [ ] denotes a quantization operation, and d( ) denotes a predefined quantization error metric.

20. The system of claim 19, wherein said plurality of rotation angles include a zero rotation angle and at least one non-zero rotation angle.

21. A product including a non-transitory storage medium having stored thereon instructions that, when executed by a machine, result in:

receiving a plurality of non-quantized phase values corresponding to a plurality of antenna elements of a phased-array antenna;
based on the plurality of non-quantized phase values, rotating said plurality of non-quantized phase values by a selected rotation angle to determine a plurality of rotated non-quantized phase values, wherein said selected rotation angle satisfies the following condition:

$$\tan(\theta) = \frac{1}{2^k}$$

wherein θ denotes said selected rotation angle, and wherein k denotes a positive integer; and
generating a plurality of quantized phase values by quantizing said plurality of rotated non-quantized phase values.

22. The product of claim 21, wherein said instructions result in selecting said rotation angle from a plurality of predefined rotation angles based on quantization errors resulting from applying said plurality of rotation angles to said non-quantized phase values, wherein a quantization error resulting from the selected rotation angle is lesser than a quantization error resulting from each rotation angle of said plurality of rotation angles.

23. A product including a non-transitory storage medium having stored thereon instructions that, when executed by a machine, result in:

receiving a plurality of non-quantized phase values corresponding to a plurality of antenna elements of a phased-array antenna;
based on the plurality of non-quantized phase values, selecting a selected rotation angle from a plurality of predefined rotation angles according to the following condition:

$$\theta_{selected} = \arg\min_\theta(d([X*e^{j\theta}], X*e^{j\theta}))$$

wherein $\theta_{selected}$ denotes the selected rotation angle, θ denotes a particular rotation angle of said plurality of rotation angles, X denotes a complex vector of said non-quantized phase values, [ ] denotes a quantization operation, and d( ) denotes a predefined quantization error metric;
rotating said plurality of non-quantized phase values by the selected rotation angle to determine a plurality of rotated non-quantized phase values; and
generating a plurality of quantized phase values by quantizing said plurality of rotated non-quantized phase values.

* * * * *